United States Patent
Masseroni et al.

(10) Patent No.: US 8,144,703 B2
(45) Date of Patent: Mar. 27, 2012

(54) METHOD TO REDUCE THE TRANSMISSION LATENCY IN GSM/EDGE DELAY-SENSITIVE APPLICATIONS

(75) Inventors: Carlo Masseroni, Rho (IT); Sergio Parolari, Milan (IT); Riccardo Trivisonno, Cinlsello Balsamo (IT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 732 days.

(21) Appl. No.: 11/992,121

(22) PCT Filed: Apr. 17, 2007

(86) PCT No.: PCT/EP2007/003362
§ 371 (c)(1),
(2), (4) Date: Mar. 17, 2008

(87) PCT Pub. No.: WO2007/118703
PCT Pub. Date: Oct. 25, 2007

(65) Prior Publication Data
US 2009/0137252 A1    May 28, 2009

(30) Foreign Application Priority Data
Apr. 19, 2006 (EP) .................................. 0642527

(51) Int. Cl.
*H04L 12/28* (2006.01)
*H04L 12/56* (2006.01)
*H04W 4/00* (2009.01)
*H04W 40/00* (2009.01)
(52) U.S. Cl. ..... 370/389; 370/392; 370/394; 455/422.1; 455/446
(58) Field of Classification Search .................. 370/389, 370/392, 394; 455/422.1, 446
See application file for complete search history.

(56) References Cited

U.S. PATENT DOCUMENTS
6,415,410 B1    7/2002    Kanerva et al.
(Continued)

FOREIGN PATENT DOCUMENTS
WO    2004/091130    10/2004

OTHER PUBLICATIONS

"$3^{rd}$ Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7)", 3GPP TS 44.060 V7.3.0 (Jan. 2006), pp. 1-439.

*Primary Examiner* — Chi Pham
*Assistant Examiner* — Farah Faroul
(74) *Attorney, Agent, or Firm* — Staas & Halsey LLP

(57) ABSTRACT

A transmitting peer transmits radio blocks over a radio interface from within a transmit window. A receiving peer receives the radio blocks within a receive window, and in case of a not correctly received radio block, sending back a NACK (Not Acknowledged) signaling message to inform the transmitting peer of reception failure. Upon reception of the NACK signaling message, the transmitting peer retransmits, until expiration of the transmit window, the not correctly received RLC/MAC radio block. The radio blocks are re-assembling in sequence at the receiving peer. Each radio block is considered as being permanently lost if not correctly received within the receive window. All correctly received radio blocks are delivered to a higher protocol layer. The network transmits a notification message to both the transmitting peer and the receiving peer to select a size of the transmit and receive windows inside a range of predetermined values including values less than 64 radio blocks.

11 Claims, 4 Drawing Sheets

Table 2

| Coding bit 5 4 3 2 1 | Value of EGPRS window size |
|---|---|
| 0 0 0 0 0 | 1 |
| 0 0 0 0 1 | 2 |
| 0 0 0 1 0 | 4 |
| 0 0 0 1 1 | 6 |
| 0 0 1 0 0 | 8 |
| 0 0 1 0 1 | 10 |
| 0 0 1 1 0 | 12 |
| 0 0 1 1 1 | 14 |
| 0 1 0 0 0 | 16 |
| 0 1 0 0 1 | 18 |
| 0 1 0 1 0 | 20 |
| 0 1 0 1 1 | 22 |
| 0 1 1 0 0 | 24 |
| 0 1 1 0 1 | 26 |
| 0 1 1 1 0 | 28 |
| 0 1 1 1 1 | 30 |
| 1 0 0 0 0 | 32 |
| 1 0 0 0 1 | 34 |
| 1 0 0 1 0 | 36 |
| 1 0 0 1 1 | 38 |
| 1 0 1 0 0 | 40 |
| 1 0 1 0 1 | 42 |
| 1 0 1 1 0 | 44 |
| 1 0 1 1 1 | 46 |
| 1 1 0 0 0 | 48 |
| 1 1 0 0 1 | 50 |
| 1 1 0 1 0 | 52 |
| 1 1 0 1 1 | 54 |
| 1 1 1 0 0 | 56 |
| 1 1 1 0 1 | 58 |
| 1 1 1 1 0 | 60 |
| 1 1 1 1 1 | Reserved |

U.S. PATENT DOCUMENTS

| | | | |
|---|---|---|---|
| 6,859,449 B2 * | 2/2005 | Gronberg et al. | 370/338 |
| 6,891,818 B1 * | 5/2005 | Jarvosalo et al. | 370/337 |
| 6,895,057 B1 * | 5/2005 | Balachandran et al. | 375/259 |
| 7,082,103 B2 * | 7/2006 | Schieder et al. | 370/231 |
| 2003/0002532 A1 * | 1/2003 | Huo | 370/474 |
| 2004/0047331 A1 | 3/2004 | Jang | |
| 2005/0013247 A1 * | 1/2005 | Sipola et al. | 370/230 |
| 2006/0132265 A1 * | 6/2006 | Laurila | 333/238 |
| 2006/0182057 A1 * | 8/2006 | Singvall et al. | 370/329 |
| 2008/0207120 A1 * | 8/2008 | Kurina et al. | 455/39 |
| 2009/0175246 A1 * | 7/2009 | Koo | 370/336 |
| 2010/0103873 A1 * | 4/2010 | Buracchini | 370/328 |

* cited by examiner

Table 1 KNOWN ART

| Window size | Coding bit 5 4 3 2 1 | Timeslots allocated (multislot capability) | | | | | | | |
|---|---|---|---|---|---|---|---|---|---|
| | | 1 | 2 | 3 | 4 | 5 | 6 | 7 | 8 |
| 64 | 00000 | | | | | | | | |
| 96 | 00001 | | | | | | | | |
| 128 | 00010 | | | | | | | | |
| 160 | 00011 | | | | | | | | |
| 192 | 00100 | Max | | | | | | | |
| 224 | 00101 | | | | | | | | |
| 256 | 00110 | | Max | | | | | | |
| 288 | 00111 | | | | | | | | |
| 320 | 01000 | | | | | | | | |
| 352 | 01001 | | | | | | | | |
| 384 | 01010 | | | Max | | | | | |
| 416 | 01011 | | | | | | | | |
| 448 | 01100 | | | | | | | | |
| 480 | 01101 | | | | | | | | |
| 512 | 01110 | | | | Max | | | | |
| 544 | 01111 | | | | | | | | |
| 576 | 10000 | | | | | | | | |

FIG.2a (continue)

Table 1 KNOWN ART (continuation)

| | | | | | | | | | | | | | |
|---|---|---|---|---|---|---|---|---|---|---|---|---|---|
| 608 | 10001 | | | | | | | | | | | | |
| 640 | 10010 | | | | | | | | | | | | |
| 672 | 10011 | Max | | | | | | | | | | | |
| 704 | 10100 | | | | | | | | | | | | |
| 736 | 10101 | | | | | | | | | | | | |
| 768 | 10110 | | | Max | | | | | | | | | |
| 800 | 10111 | | | | | | | | | | | | |
| 832 | 11000 | | | | | | | | | | | | |
| 864 | 11001 | | | | | | | | | | | | |
| 896 | 11010 | | | | | Max | | | | | | | |
| 928 | 11011 | | | | | | | | | | | | |
| 960 | 11100 | | | | | | | | | | | | |
| 992 | 11101 | | | | | | | | | | | | |
| 1024 | 11110 | | | | | | | Max | | | | | |
| Reserved | 11111 | x | x | x | x | x | x | x | x | x | x | x | x |

NOTE: The shaded cells represent the allowed window sizes.

FIG.2b

METHOD TO REDUCE THE TRANSMISSION LATENCY IN GSM/EDGE DELAY-SENSITIVE APPLICATIONS

CROSS-REFERENCE TO RELATED APPLICATIONS

This application claims the benefit of European Application No. 0642527.1, filed Apr. 19, 2006, in the European Intellectual Property Office, and PCT/EP2007/003362, filed Apr. 17, 2007, the disclosure of which is incorporated herein by reference.

BACKGROUND

Mobile radio networks are proposed for enhanced data transmissions and integration with multimedia IP services, and more precisely GSM/EDGE delay-sensitive applications (referenced acronyms are listed at the end of the description).

FIG. 1 shows the functional architecture of a GSM/EDGE network according to 3GPP TS 44.060. The depicted network includes the following functional blocks: MSs (TE and MT), BSS (both BTSs and BSC), SGSN, GGSN, EIR, MSC/VLR, HLR, SMS-GMSC, SMS-IWMSC, and SM-SC. Inside the MS the first functional block TE is connected to the second functional block MT through a connection indicated by a Reference point R, typically supporting a standard serial interface. The following interfaces are foreseen: Um, A-bis, A, Gb, Gi, Gp, Gn, Gp, Gf, Gs, Gr, Gd, D, E, C, whose connectivity between the relevant blocks are directly visible in the figure.

Every MS (MT) is connected to its serving BTS through the Um radio interface for exchanging voice and data services and the relevant signaling. The BSS includes a plurality of BTS connected to a BSC through a respective A-bis interface. The BSC is connected to the core network, mainly including MSC and SGSN, through the A and Gb interfaces accounting for circuit switched domain (CS) and packet switched domain (PS), respectively. Former BSSs are evolved in GERANs in order to allow higher data throughputs and incremental redundancy when erroneous data blocks are retransmitted. Furthermore, the Gn interface connects two GSN nodes in the same PLMN system, while the Gp interface connects two GSN nodes belonging to different PLMN systems. In operation, the sub-set of MAC procedures governing the multiplexing of the transmissions on shared channels provides the MS with temporary assignment of resources on the physical layer to sustain the single transmission. Resources are assigned for each so-called UL/DL TBF associated to the MS. More detailed notions on TBFs and network operation are given later in the description.

3GPP Technical Specifications are being improved to support advanced services. A main target for GERAN is to support real-time multimedia services over IP using the GPRS capability, e.g. VoIP, TV channels, combinational services, etc. In order to get an end-to-end delay sufficiently low to provide a "real-time interaction" between users, the network transmission delay (latency) shall be reduced as much as possible. Some new mechanisms have been recently introduced in the RLC/MAC protocol to reduce latency and guarantee a good voice quality. A first one is based on TTI reduction. A reduced TTI (say of 10 ms, instead of 20) would reduce the RLC RTT, thus allowing the possibility to perform retransmissions fast enough to maintain the end-to-end delay requirements. A second mechanism is the non-persistent mode of transmission, as defined in 3GPP TS 44.060, V7.3.0 (2006-01), Release 7; see for example:

Section 9—RLC procedures in packet transfer mode;
clause 9.1—Procedures and parameters for peer-to-peer operation;
subclause 9.1.12—Re-assembly of upper layer PDUs from RLC data units.

The transmission/reception window is a fundamental concept valid in general both for persistent and non-persistent mode of transmission. The following related terms apply:

WS=Window Size: 64 to 1024 in EGPR; 64 in GPRS.
SNS=Sequence Number Space: 2048 in EGPRS, and 128 in GPRS.
BSN—Block sequence number (subclause 9.1.4.2). Each RLC data block contains a block sequence number (BSN) field that is 11 bits in length. At the time that an in-sequence RLC data block is designated for transmission, the value of BSN is set equal to the value of the send state variable V(S).
V(S)—Send state variable (subclause 9.1.1). Each RLC endpoint transmitter shall have an associated send state variable V(S). V(S) denotes the sequence number of the next in-sequence RLC data block to be transmitted. V(S) can take on the value 0 through SNS −1. V(S) shall be set to the value 0 at the beginning of each TBF in which the RLC endpoint is the transmitter. The value of V(S) shall be incremented by 1 after transmission of the RLC data block with BSN=V(S). In RLC acknowledged mode, V(S) shall not exceed V(A) modulo SNS by more than the maximum allowed number of outstanding RLC data blocks WS. In RLC non-persistent mode, V(S) may be incremented independently on the value of V(A).
V(A)—Acknowledge state variable (see subclause 9.1.2). In RLC acknowledged mode, each RLC endpoint transmitter shall have an associated acknowledge state variable V(A). V(A) contains the BSN value of the oldest RLC data block that has not been positively acknowledged by its peer. V(A) can take on the values 0 through SNS −1. V(A) shall be set to the value 0 at the beginning of each TBF in which the RLC endpoint is the transmitter. The value of V(A) shall be updated from the values received from its peer in the received block bitmap (RBB) of the Packet Ack/Nack message.
V(R)—Receive state variable (see subclause 9.1.5). Each RLC endpoint receiver shall have an associated receive state variable V(R). The receive state variable denotes the BSN which has a value one higher than the highest BSN yet received (modulo SNS). V(R) shall be set to the value <1>O<1> at the beginning of each TBF in which the RLC endpoint is the receiver. V(R) can take on the value 0 through SNS.
V(Q)—Receive window state variable (see subclause 9.1.6). Each RLC endpoint receiver shall have an associated receive window state variable V(Q). The receive window state variable denotes the lowest BSN not yet received (modulo SNS), therefore representing the start of the receive window. V(Q) shall be set to the value 0 at the beginning of each TBF in which the RLC endpoint is the receiver. The receive window state variable can take on the value 0 through SNS −1.

In case of mobile stations with multislot capability, windows for EGPRS TBFs can assume the size values specified in Table 1 illustrated in FIGS. 2a and 2b, depending on the number of timeslots allocated to the TBF. In Table 1 (see subclause 9.1.9) the grey area for a given timeslot allocation represents an usable window size, optionally comprised within 64 RLC/MAC blocks and the Maximum indicated value. In any case, the window size can not assume a value lower then 64 RLC Blocks. The window size determines the receive window at receiving RLC/MAC Layer entity.

Due to "in sequence RLC delivery property", RLC Blocks received inside the receive window can not be delivered to upper layers (LLC Layer) even if all/the RLC data corresponding to an LLC Frame have been completely received. This behavior adds additional delay to received data, becoming a drawback for delay sensitive services (e.g. VoIP). The aim of non-persistent mode is to prevent the transmitter from persistent retransmissions in case one or more data blocks are badly received, and the receiver has signaled back the side events. According to 3GPP TS 44.060, paragraph 9.1, the following arguments (updated with the most recent knowledge, although not yet standardized by 3GPP) further help the comprehension of the technical problem (italics is reported from the specification):

"A TBF is comprised of two peer entities, which are the RLC endpoints. Each RLC endpoint has a receiver that receives RLC/MAC blocks. Each RLC endpoint also has a transmitter that transmits RLCMAC blocks. A bearer is comprised of one transmitting RLC endpoint and at least one receiving RLC endpoint. The transmitting RLC endpoint transmits RLC/MAC data and control blocks and may receive RLC/MAC control blocks. Each receiving RLC endpoint receives RLC/MAC data and control blocks and may transmit only RLC/MAC control blocks. The bearer can operate in RLC non-persistent mode" An RLC data block is considered received, when it is received in a layer 1 frame with consistent parity bits (in EGPRS TBF mode: header and relevant data parity bits) and correctly addresses the receiving RLC endpoint.

In RLC acknowledged mode, the receive window is defined by the receive window state variable $V(Q)$ in the following inequality of $V(Q)<BSN<V(Q)+WS$] modulo SNS All BSNs which meet that criteria are valid within the receive window.

In RLC unacknowledged mode, all values of BSN are within the receive window.

In RLC non-persistent mode, the receive window is determined after recalculating the receive state variable $V(R)$ (as described in sub-clause 9.1.5) and the corresponding receive window state variable $V(Q)$ (as described in sub-clause 9.1.6). All BSNs which meet the following inequality modulo SNS are valid within the receive window.

Each endpoint's transmitter has a transmit window of size WS. In RLC acknowledged mode and in RLC non-persistent mode, the transmit window is defined by the send state variable $V(S)$ in the following inequality: modulo SNS, where modulo SNS <=WS. All BSNs which meet that criteria are valid within the transmit window. In RLC unacknowledged mode, all values of BSN are within the transmit window.

According to 3GPP TS 44.060, clause 9.3.4: 'The transfer of RLC data blocks in the RLC non-persistent mode includes non-exhaustive retransmissions. The block sequence number (BSN) in the RLC data block header is used to number the RLC data blocks for reassembly. The receiving side sends DOWNLINK ACK/NACK messages to inform the transmitting side of the status of the reception and to convey neighboring cell measurements".

According to 3GPP TS 44.060, paragraph 9.1.12: "During RLC non-persistent mode operation, received upper layer PDUs shall be delivered to the higher layer in the order in which they were originally transmitted. Nevertheless, since some RLC data units may not be received, some upper layer PDUs may be re-assembled and delivered to the higher layer erroneously. During media/multimedia bearer each receiving RLC endpoint shall use RLC data units up to the one characterized by $BSN=V(Q)-1$ when reassembling upper layer PDUs, even if some RLC data units are missing. Fill bits having the value V shall be substituted for RLC data units not received . . . ".

Despite non-persistent mode of operation, also the minimum window size causes an intrinsic latency. An example is useful to clarify the matter. Let us suppose WS=64 and until BSN=9, included, all RLC/MAC radio blocks are correctly received with cadence of 20 ms: hence $V(Q)=IO$. Let us suppose now that all blocks successive to 10 (namely 11, 12, 13 . . . ) arrive to the receiver and that block with BSN=10 is retransmitted for X times without ever being correctly received. The receiver, before considering the BSN=10 as not more receivable, and then deliver the windowed data to the upper LLC protocol layer for "in sequence" delivering, must receive the radio block with BSN=74 (namely $V(R)=75$). Because of non-persistent mode operation, blocks having a $BSN<V(R)$ WS will be discarded. In the specific, BSN<75 64 (<1 1) corresponding to BSN=10 will be discarded. At this point all windowed data are delivered to the upper layer with a delay of 20 ms×64=1,280 ms affecting all windowed data (packets and voice), obviously unacceptable for real-time media or multimedia services.

SUMMARY

In view of the related art described, one potential object is to provide a method to improve the support of delay sensitive services (e.g. Voice over IP) in GERAN networks. More in particular, an improvement to the actual RLC/MAC protocol working in Non-Persistent Mode, as defined in 3GPP TS 44.060, without excessive impacting the current standardization and plenty compatible with the existing and legacy equipments is urgently needed.

The inventors proposed a method for a GSM/EDGE compliant mobile radio network to reduce the of media or multimedia real-time transmissions of RLC/MAC radio blocks delivered to the higher protocol layer.

The proposed method includes the step of:
setting, by the network (BSC), resources for establishing at least an unidirectional temporary flows of radio blocks defined at RLC/MAC protocol, called TBF, comprised of two peer entities acting as RLC endpoints, each one having a receiver that receives RLC/MAC radio blocks and a transmitter that transmits RLC/MAC radio blocks;
transmitting, by the network (BSS), a notification message to both said transmitting and receiving entities (MS, BSS) to address the size of the transmit/receive window inside a range of predetermined values including values lower than 64 RLC/MAC radio blocks;
receiving, by both the receiving and the transmitting entities, said RLC/MAC messages with said additional signaling bit asserted/negated, decoding said additional signaling bit and behave accordingly;
transmitting RLC/MAC radio blocks, by the transmitting entity, within the transmitting time window;
receiving RLC/MAC radio blocks, by the receiving entity, within the receiving time window and in case of not correctly received radio block sending back ACK/NACK signaling messages to inform the transmitting entity of the status of the reception;
non-exhaustively retransmitting, by the transmitting entity upon reception of ACK/NACK signaling messages, the radio blocks not correctly received by the receiving entity;

re-assembling, by the receiving entity, and in-sequence delivering to the higher protocol layer all correctly received RLC/MAC radio blocks, considering as definitively lost each radio block not yet correctly received when it falls outside of the receive window.

Preferably, the notification message is broadcast on a common channel.

Alternatively, the notification message corresponds to one of the RLC/MAC messages relevant to the TBFs where the transmit/receive window size information element is included. These dedicated messages already include a code word information element configurable by the network (BSS) to address inside a range of predetermined values greater than or equal to 64 RLC/MAC radio blocks the size of said transmit/receive window. In this second eventuality, the method further includes the steps of:

setting, by the network, the asserted/negated logical value of an additional signaling bit in said RLC/MAC messages where the indication of the window size information element is included, to indicate which of the two ranges of predetermined values is addressed by the configuration of said code word;

receiving, by the mobile station, an RLC/MAC message with the additional signaling bit asserted/negated, decoding the additional signaling bit and setting the transmit/receive window size value accordingly.

Packet Uplink Assignment, Packet Downlink Assignment, Packet Timeslot Reconfigure, etc., are examples of messages relevant to a TBF the transmitting/receiving window size information element is reported. Using non-persistent RLC mode with a proper small value for the window size, the performances of the network for delay sensitive services are greatly improved. Non-persistent mode allows RLC block retransmissions to reduce the packet loss, while the window size value could be used to determine the maximum delay before re-assembling LLC frames. A trade-off has to be set between the quality increase due to lower delays and quality decreasing due to the increased number of lost RLC blocks.

Profitably, the former range of 32 predetermined window size values spanning 64 to 1024 radio blocks (see Table 1) is remapped into a second range of 32 predetermined window size values spanning 1 to 64 radio blocks. Experimentally determined optimal values for the window size span 12 to 16 radio block durations. Adopting these values, the large 1,280 ms latency of the previous example is reduced to more acceptable values of 240 to 320 ms, but smaller values are possible without significantly increasing the discarded radio blocks. It can be argued that with the proposed method an increase of the maximum window size with the number of allocated timeslots (Table 2) is not recognizable.

The MAC protocol must be upgraded to include the proposed features with the next change of relevant 3GPP standardization. It can be appreciated that for delay-sensitive services, such as the ones devoted to media/multimedia real-time transmissions, latency is drastically reduced.

BRIEF DESCRIPTION OF THE DRAWINGS

These and/or other aspects and advantages will become apparent and more readily appreciated from the following description of the embodiments taken in conjunction with the accompanying drawings in which:

FIGS. 2a and 2b, already described, show a Table 1 of the known art (broken in two contiguous parts for graphical reasons) illustrating possible sizes of the transmission window as a function of number of timeslots allocated to a Mobile Station with multislot capability;

DETAILED DESCRIPTION OF THE EMBODIMENTS

Figure 1:
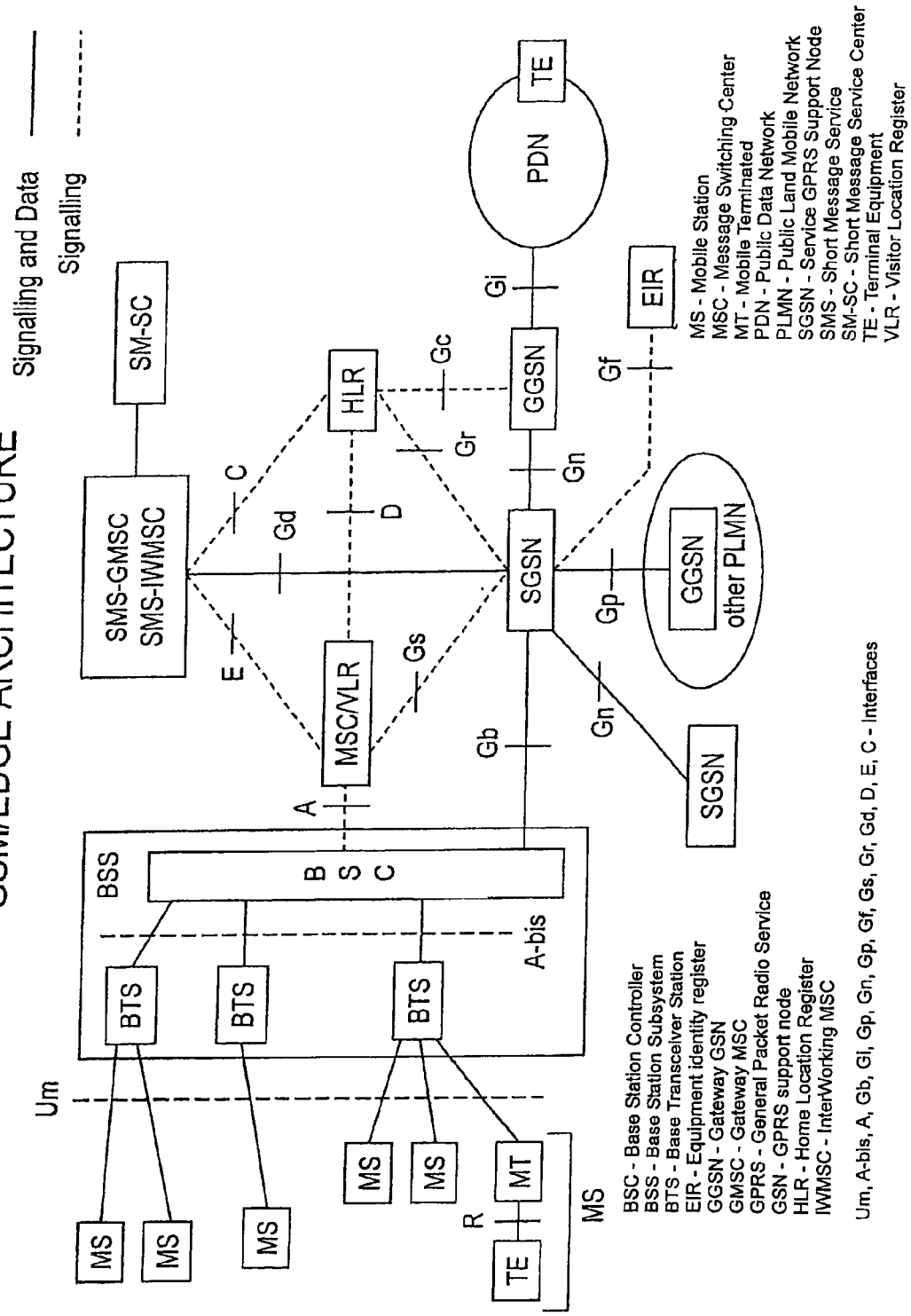
FIG. 1, already described in the structure, shows the functional architecture of the GSM/EDGE network.
Figure 3:
FIG. 3 shows a Table 2 (broken in two contiguous parts for graphical reasons) illustrating possible sizes of the transmission window according to the proposed method.

Reference will now be made in detail to the embodiments, examples of which are illustrated in the accompanying drawings, wherein like reference numerals refer to the like elements throughout. The embodiments are described below to explain the present invention by referring to the figures.

With reference to the GSM/EDGE network of FIG. 1, in operation, at the Um and A-bis interfaces several protocols are stacked upon the physical layer, in particular:—SNDCP, LLC, RLC, and MAC. The SNDCP protocol controls the transfer of network protocol units (N-PDUs) between the MS mobile and SGSN node. The main functions of the SNDCP protocol are:

Multiplexing of packet data protocols, for instance IP.
Compression/decompression of the user data packets.
Compression/decompression of the protocol control information.—Segmentation of NPDUs within LLC frames and re-assembly of the LLC frames the NPDUs.

To carry out these functions the SNDCP protocol avails of a NSAPI to identify in the MS mobile the access point to a packet data protocol PDP, while in SGSN and GGSN nodes it identifies the context associated to an address of the above mentioned PDP protocol.

The RLC gives a reliable radio link and maps the LLC frames within the physical GSM channels. The RLC/MAC avails of the following GPRS channels: PBCCH, PCCCH, PACCH, and PDTCH conveyed on PDCH. The RLC/MAC packet is mapped on radio blocks of the GSM multiframe. A radio block is transported by four consecutive Normal bursts. At physical layer the four Normal bursts are interleaved on four consecutive TDMA frames of 4,615 ms duration. The physical link layer protocol is responsible for FEC block code enabling error detection and correction at the receiver. Four convolutional coding schemes (CS-1, ... CS4) are foreseen for the GPRS, and nine modulation and coding schemes (CS-1, ... CS9) for the EGPRS, generating different bitrates. Signaling procedures for accessing the radio channel are controlled by MAC, which also governs dynamic allocation of the resources (request and grant). Dynamic allocation means that a particular transmission resource, including for example a PDCH channel on a physical timeslot, is made time division shareable among more MS mobiles, each of them being engaged in an active session of data transfer, or signaling, through the same transmission resource jointly assigned. To the specific aim of dynamic allocation, the BSC includes a PCU implementing a proprietary scheduling algorithm.

The sub-set of MAC procedures governing the multiplexing of the transmissions on the shared channels, provide the MS with temporary assignment of resources, called TBFs, on the physical layer to sustain the single transmission. A TBF may include memory buffer to house the queues of RLC/MAC blocks. Each TBF assignment enables the unidirectional transfer of radio blocks (for payload data and signaling) within a cell between the network and a mobile station MS, or vice versa. Control messages for the establishment/abatement of a connection between service points and the allocation/deallocation of relevant supported physical resources, for instance the TBF buffers, contemplate different opportunities capable of covering the whole survey foreseen in the packet transfer mode of the RR sublayer. For simplicity, it is here described a very limited survey of establishment/abatement of TBF connections and of the relevant operation modes. We can start from the establishment of a TBF uplink connection following a Packet Transfer originated by the mobile. In this case the mobile requires the assignment of a GPRS channel sending a PACKET CHANNEL REQUEST message including the TBF resources requested for the transfer of packets to the network. In case of reception, the network replies with a PACKET UPLINK ASSIGNMENT message on the control channel allocating to the mobile the resources requested for the uplink transfer of packets. The resources include one or more PDCH channels and a TFI value. The network does not assign any buffer in uplink direction (the buffer resides in the mobile). The network requires simply knowing the number of blocks that a MS mobile intends to transmit. We can now proceed examining the assignment of a TBF downlink following a Packet Transfer ended towards the mobile. In this case at the end of the paging procedure, the network sends the mobile a PACKET DOWNLINK ASSIGNMENT message in the Ready state on the control channel, with enclosed the list of PDCH channels allocated for the downlink transfer. A buffer, relevant to the downlink TBF, is purposely allocated to contain the RLC/MAC blocks to be sent.

In the majority of the cases a TBF is kept alive only for the transfer of one or more LLC protocol units, to the right purpose of transferring the corresponding RLC/MAC blocks. The network assigns to each TBF its own temporary identifier, called TFI (Temporary Flow Identity). The mobile shall assume that the TFI value is unique among TBF competitors in each direction, uplink or downlink. A RLC/MAC data block is identified to the TBF to which it is associated through its own field where the identifier TFI is written, and another field to indicate the uplink or downlink direction of the block. Should the RLC/MAC block be referred to a control message, a field is foreseen to indicate the message transmission direction and type. In the case of dynamic allocation, the header of each RLC/MAC block transmitted on a PDCH channel in "downlink" direction includes an additional field called USF, which is used by the network in the form of a flag to control the time division multiplexing of different mobile stations on a physical channel PDCH in uplink direction. We can now better qualify the already mentioned PACKET UPLINK ASSIGNMENT message, sent by the network towards the mobiles, stating that it includes: the identifier TFI of the downlink/TBF buffer containing the control block carrying this message, the list of the allocated PDCH channels (time slots), and a corresponding USF value for each allocated channel (timeslot). One USF is scheduled for the transmission of one radio block. Three bits are foreseen for the USF field that enable to unambiguously discriminate up to eight users sharing a time-slot, also in the borderline case in which the single TBF buffer are associated all the eight time slots of a TDMA frame.

According to the proposed method of the BSC through the PCU assigns resources to set up (or reconfigure) a TBF associated to the uplink or downlink transmission of radio blocks from/to an MS. Several RLC/MAC messages are dealing with TBFs, for example, Packet Uplink Assignment, Packet Downlink Assignment, Packet Timeslot Reconfigure, etc. A 5-bit code word "Coding" is configured in the header of the involved RLC/MAC message to select the transmitting/receiving window size.

In a first embodiment, the network (BSS) transmit a notification message to the MSs and the BS to address the size of the transmit/receive window inside a range of predetermined values including values lower than 64 RLC/MAC radio blocks. The notification message could be a simple signaling bit (scaling bit). As the only MSs are concerned, the notification message could be broadcast with Common Channel Information.

In a second embodiment, the notification message coincides with one of said dedicated messages where the indication of the transmit/receive window size is included. In this second eventuality, an additional signaling bit, also called scaling bit, is asserted/negated by the network according to two opportunities offered by the new MAC protocol to properly select the window size. With both the embodiments a subdivision of the time windows for type of services is made possible. Traditional non real-time services, e.g. file transfer, avail of standard window sizes illustrated in Table 1 for MSs with multislot capability. Delay-sensitive services, e.g. media or multimedia real-time transmissions avail of new window sizes illustrated in Table 2 for MSs with either single-slot or multislot capability, indifferently. The scaling bit is asserted or negated by BSC accordingly. Non-persistent RLC/MAC transmission/reception mode is assumed as previously illustrated in conformance with 3GPP GSM/EDGE standardization. Both peer entities comprised in a TBF receive RLC/MAC messages with the proper setting of the scaling bit; these entities decode the scaling bit and behave accordingly. The behavior includes alternatively assuming Table 1 or Table 2 on the basis of the logical value of the scaling bit. The association of Table 1 to the scaling bit asserted and Table 2 to the negated value, or vice versa, is a matter of free choice. Whatever Table 1 or 2 is selected, the same configuration of the 5-bit "coding" information element is maintained in order to reduce the impact on the current standardization to the only scaling bit.

Used Acronyms
  3GPP—3<rd> Generation Partnership Program BCCH—Broadcast Control Channel BSC—Base Station Controller BSN—Block Sequence Number BSS—Base Station Subsystem BTS—Base Transceiver Station CCCH—Common Control Channel CS—Circuit Switched, Coding Scheme
  DL—Downlink
  EDGE—Enhanced Data rates for GSM Evolution EGPRS—Enhanced GPRS
  FACCH—Fast Associated Control Channel GERAN—GSM/EDGE Radio Access Network GGSN—Gateway GSN GMSC—Gateway MSC
  GPRS—General Packet Radio Service
  GSM—Global System for Mobile communications IWMSC—InterWorking MSC
  LLC—Logical Link Control MAC—Medium Access Protocol MBMS—Multimedia Broadcast Multicast Service MCS—Modulation and Coding Scheme MS—Mobile Station
  MSC—Message Switching Centre MT—Mobile Terminated NPDU—Network PDU NSAPI—Network SAPI PACCH—Packet Associated Control Channel
  PBCCH—Packet Broadcast Control Channel PCCCH—Packet Common Control Channel PCU—Packet Control Unit PDTCH—Packet Data Traffic Channel PDCH—Packet Data Channel PDU—Protocol Data Unit PLMN—Public Land Mobile Network PS—Packet Switched RAN—Radio Access Network RBB—Received Block Bitmap
  RLC—Radio Link Control
  RTT—Round Trip Time
  RTTI—Reduced TTI SAPI—Service Access Point Identifier SGSN—Service GPRS Support Node
SMS—Short Message Service
SNS—Sequence Number Space
SNDCP—Subnetwork Dependent Convergence Protocol
TBF—Temporary Block Flow
TE—Terminal Equipment
TFI—TBF identifier
TTI—Transmit Time Interval UL—Uplink
USF—Uplink State Flag
VLR—Visitor Location Register
VoIP—Voice over IP
V(A)—Acknowledge state variable V(Q)—Receive window state variable V(R)—Receive state variable V(S)—Send state variable WS—Window Size Although a few embodiments have been shown and described, it would be appreciated by those skilled in the art that changes may be made in these embodiments without departing from the principles and spirit of the invention, the scope of which is defined in the claims and their equivalents.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. In a Global System for Mobile/Enhanced Data rates for a GSM Evolution (GSM/EDGE) compliant mobile radio network, a method to perform media or multimedia real-time transmissions of Radio Link Control/Multiple Access Control (RLC/MAC) protocol radio blocks to a higher protocol layer, the method comprising:
   setting up, by the network, resources for establishing at least a unidirectional Temporary Block Flow (TBF) of RLC/MAC radio blocks between two peers acting as RLC endpoints, each peer having a receiver that receives RLC/MAC radio blocks and a transmitter that transmits RLC/MAC radio blocks;
   transmitting RLC/MAC radio blocks over a radio interface from a transmitting peer within a transmit window;
   receiving RLC/MAC radio blocks by a receiving peer within a receive window and, in case of a not correctly received RLC/MAC radio block, sending back a ACK/NACK signaling message to inform the transmitting peer of reception failure;
   upon reception of the ACK/NACK signaling message, retransmitting from the transmitting peer, until expiration of the transmit window, the not correctly received RLC/MAC radio block;
   re-assembling the RLC/MAC radio blocks in sequence at the receiving peer;
   considering each RLC/MAC radio block as being permanently lost if not correctly received within the receive window;
   delivering all correctly received RLC/MAC radio blocks to the higher protocol layer; and
   transmitting, by the network, a notification message to both the transmitting peer and the receiving peer to select a size of the transmit and receive windows inside a range of predetermined values less than 64 RLC/MAC radio blocks.

2. The method of claim 1, wherein the notification message is broadcast on a common channel.

3. The method of claim 1, wherein
   there is a first range for transmit and receive window sizes including values less than 64 RLC/MAC radio blocks,
   there is a second range for transmit and receive window sizes greater than or equal to 64 RLC/MAC radio blocks,
   a code word is used to indicate to the transmitting peer and the receiving peer the size of the transmit and receive windows,
   the notification message signals the transmitting peer and the receiving peer on whether to use the first range or the second range,
   both the code word and the notification message are included in a RLC/MAC message.

4. The method of claim 3, wherein:
   an additional signaling bit in the RLC/MAC message is used to indicate whether the first or second range should be used,
   the transmitting peer is a base station of the network and the receiving peer is a mobile station, and
   the mobile stations decode the additional signaling bit and set the transmit/receive window size accordingly.

5. The method of claim 4, wherein the range of predetermined values less than 64 RLC/MAC radio blocks includes a unitary window size value.

6. The method of claim 5 wherein the range of predetermined values less than 64 RLC/MAC radio blocks includes 32 values.

7. The method of claim 1, wherein the range of predetermined values less than 64 RLC/MAC radio blocks includes a unitary window size value.

8. The method of claim 1 wherein the range of predetermined values less than 64 RLC/MAC radio blocks includes 32 values.

9. A method for communication in a network, comprising:
   transmitting radio blocks over a radio interface from a transmitting peer within a transmit window;
   receiving radio blocks by a receiving peer within a receive window and, in case of a not correctly received radio block, sending back a failure message to inform the transmitting peer of reception failure;
   upon reception of the failure message, retransmitting from the transmitting peer, until expiration of the transmit window, the not correctly received radio block;
   considering each radio block as being permanently lost if not correctly received within the receive window;
   transmitting, by the network, a notification message to both the transmitting peer and the receiving peer to select a size of the transmit and receive windows inside a range of predetermined values less than 64 radio blocks.

10. The method according to claim 9, further comprising setting the size of the transmit window to a value less than 64 radio blocks.

11. The method according to claim 9, further comprising setting the size of the receive window to a value less than 64 radio blocks.

* * * * *